United States Patent [19]
Strolle et al.

[11] Patent Number: 5,588,025
[45] Date of Patent: Dec. 24, 1996

[54] SINGLE OSCILLATOR COMPRESSED DIGITAL INFORMATION RECEIVER

[75] Inventors: Christopher H. Strolle, Glenside, Pa.; Steven T. Jaffe, Freehold; Paul W. Lyons, New Egypt, both of N.J.

[73] Assignee: David Sarnoff Research Center, Inc., Princeton, N.J.

[21] Appl. No.: 406,216

[22] Filed: Mar. 15, 1995

[51] Int. Cl.$^6$ ............ H04L 27/06; H04L 27/14; H04L 27/22; H04L 7/00
[52] U.S. Cl. ............................. 375/316; 375/355
[58] Field of Search ........................... 375/316, 320, 375/322, 340, 355, 354, 377; 370/84, 94.1, 94.2, 100.1; 364/724.1, 723

[56] References Cited

U.S. PATENT DOCUMENTS

| | | | |
|---|---|---|---|
| 4,805,191 | 2/1989 | Burch et al. | 375/355 |
| 5,309,484 | 5/1994 | McLane et al. | 375/355 |
| 5,400,368 | 3/1995 | Cheng et al. | 375/354 |
| 5,524,126 | 6/1996 | Clewer et al. | 375/355 |

OTHER PUBLICATIONS

"Information Technology–Generic Coding of Moving Pictures and Associated Audio", Recommendation H.222.0, ISO/IEC 13818-1, Jun. 10, 1994.

*Primary Examiner*—Stephen Chin
*Assistant Examiner*—Hai H. Phan
*Attorney, Agent, or Firm*—William J. Burke

[57] ABSTRACT

A digital information receiver having a single oscillator providing a clock signal to the receiver circuitry. The receiver contains, in addition to the oscillator, an input signal processor, a symbol timing loop, a demodulator, a transport decoder, a transport timing loop, one or more applications decoders and a presentation device. The input signal processor digitizes an input signal and resamples the input signal using an interpolator such that the input signal is optimally sampled. The resampling is controlled by a symbol timing loop. In a first embodiment, the transport timing loop controls the frequency of the oscillator using transmitter timing information contained in the received signal. In a second embodiment, the oscillator is a free running oscillator and the transport timing loop controls a numerically controlled counter that, in turn, controls presentation timing of the information carried by the information in the input signal. After the input signal is decoded, an output interpolator generates continuous signals from somewhat bursty signals for utilization by the presentation device.

21 Claims, 11 Drawing Sheets

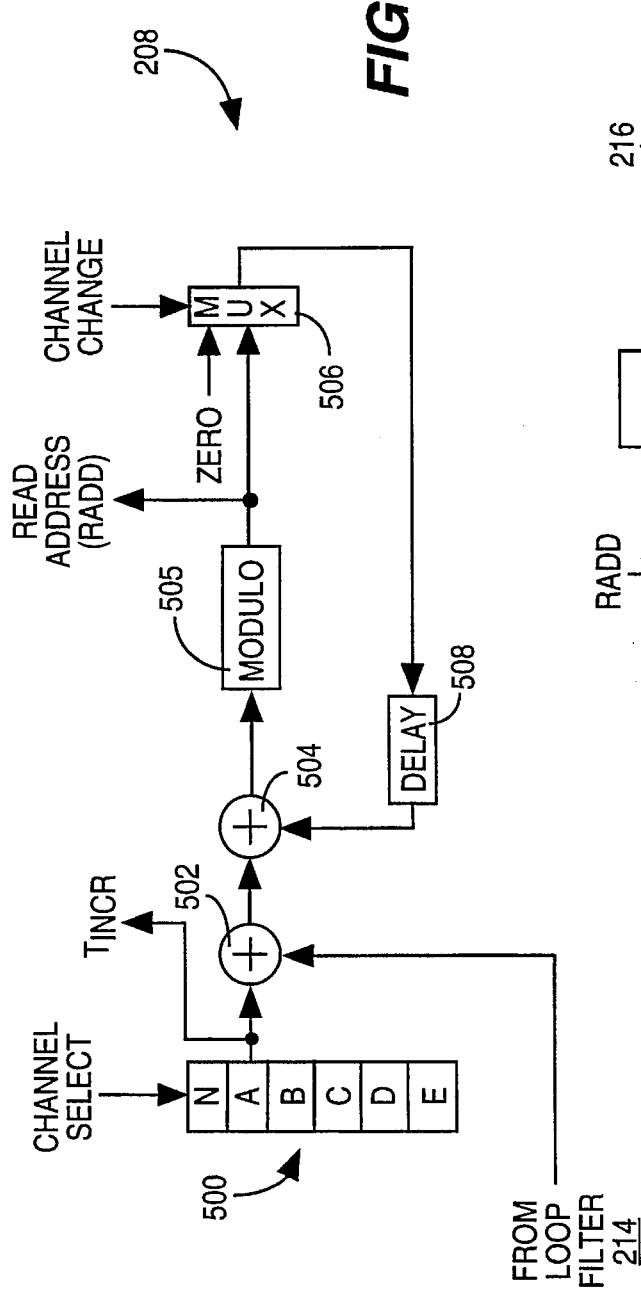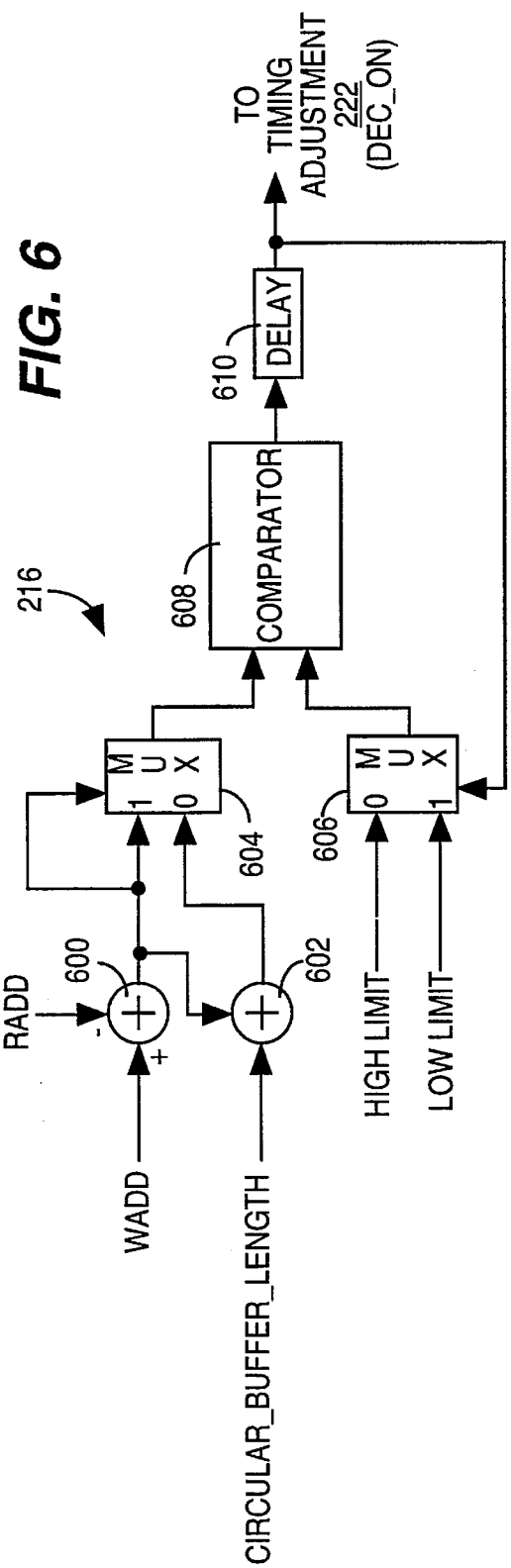

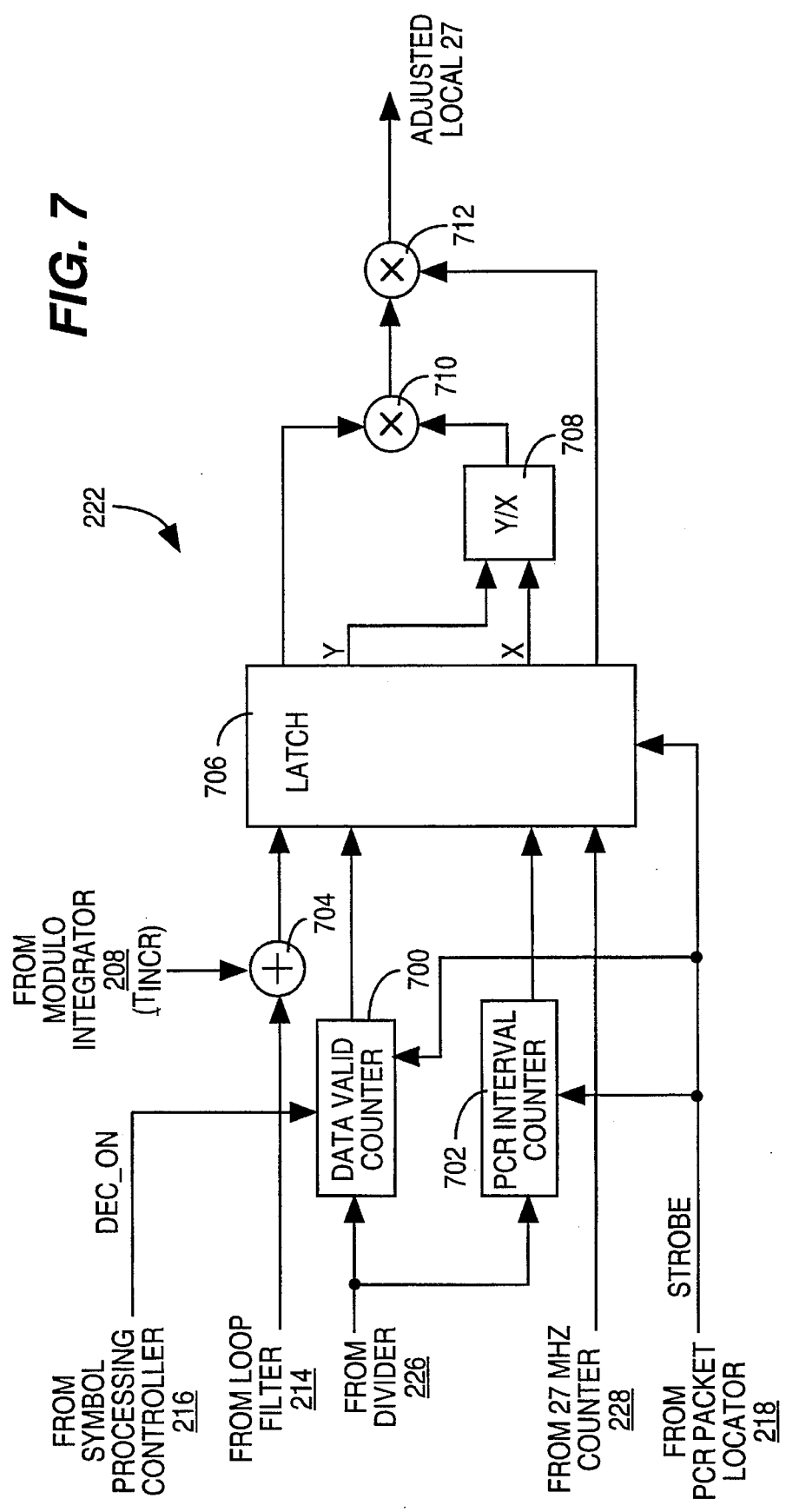

SINGLE OSCILLATOR COMPRESSED DIGITAL INFORMATION RECEIVER

BACKGROUND OF THE DISCLOSURE

1. Field of the Invention

The invention relates to digital information transmission systems and, more particularly, to a digital information transmission system containing a receiver having a single oscillator for demodulating and decompressing digital information.

2. Description of the Background Art

A conventional digital information transmission system contains a data source, a transmitter, a transmission medium, and a receiver. Illustratively, in a digital television system, the data source is a digitized audio-video signal, the transmitter contains a plurality of application encoders (e.g., a video signal encoder (MPEG), an audio signal encoder, and a system control information encoder), a transport encoder for packetizing and multiplexing the encoded signals and a M-ary quadrature amplitude modulation (QAM) modulator. The transmission medium is typically a cable network. The receiver in a digital television system contains a demodulator for demodulating the QAM signal, a transport decoder for depacketizing and demultiplexing the encoded signals, a plurality of application decoders, and a presentation device for displaying the information from the data source to a user, e.g., the presentation device can be a conventional television. Such a receiver, though not currently available to the public, is foreseen to be a "set-top" unit within a system user's home. This form of digital information transmission system is widely known in the art. One example is a digital National Television Standards Committee (NTSC) television system. A draft standard for video and audio coding techniques to be used in a digital television system is disclosed in "Information Technology-Generic Coding of Moving Pictures and Associated Audio", Recommendation H.222.0, ISO/IEC 13818-1. Jun. 10, 1994.

More specifically, a conventional digital television receiver contains a tuner for selecting a channel of information and a demodulator for demodulating an M-ary QAM signal received from the transmission network. The demodulator is sometimes referred to in the art as a network interface module or NIM. The demodulator produces a serial baseband digital signal (a bit stream containing packetized and multiplexed digital information). As is well-known in the art, the demodulator accomplishes carrier recovery, signal equalization, packet synchronization and the like, to generate a useful baseband digital signal. The baseband signal must be further processed by a transport decoder to extract from the baseband signal the video, audio and timing information within the data packets.

The conventional transport decoder in an digital television system generally functions as a sophisticated phase lock loop that operates at 27 MHz, e.g., the transport decoder is synchronized to a 27 MHz reference oscillator within the transmitter that contains the application encoder. This 27 MHz clock rate (known as the transport clock rate) is double the standard video sampling rate used by the transport encoder under standard CCR 601. Since the receiver uses the 27 MHz clock signal only for decoding the encoded information carried in the transmitted packets, the 27 MHz clock signal is completely unrelated to the transmission rate for channel symbols. In other words, the received signals, once demodulated using conventional timing synchronization techniques, produce a baseband digital signal having symbol and bit rates that are unrelated to the 27 MHz. Typically, the symbol rate is much less than the transport decoder clock rate. To synchronize the baseband signal symbol rate to the transport clock signal rate, the baseband symbols are written to a buffer at the symbol rate and read from the buffer at the transport decoder clock rate. To facilitate such buffering, a first-in, first-out (FIFO) memory is used. Detrimentally, since the demodulator and the transport decoder operate at two different frequencies, they each must have their own frequency sources (e.g., separate crystal oscillators for separately timing the write and read FIFO operations).

Additionally, using a FIFO to temporarily store symbols in this manner requires the system to operate at a single symbol rate unless multiple oscillators are available to provide a number of write address rates, i.e., a clock rate commensurate with each symbol rate. In a conventional receiver having a multiple symbol rate capability, when the symbol rate changes, the timing system is altered to accommodate the new symbol rate, i.e., a different clock rate is selected to control the FIFO write operation. Consequently, multiple symbol rate receivers are complicated and costly.

Therefore, a need exists in the art for a receiver that uses a clock signal from a single crystal oscillator to accomplish symbol timing and transport decoder timing. Additionally, a need exists in the art for a receiver that uses a single crystal oscillator and yet demodulates a plurality of symbol rates.

SUMMARY OF THE INVENTION

The disadvantages associated with prior art digital information receivers are overcome by a receiver having a single crystal oscillator. This single oscillator provides a single clock rate for both signal demodulation and transport decoding. The receiver is capable of receiving a number of different channel symbol rates without altering this clock rate.

Specifically, one embodiment of the receiver contains an input signal processor, a symbol timing loop, a demodulator, a transport decoder, a transport timing loop, one or more application decoders, and one or more presentation devices. The input signal processor digitizes and interpolates the input signal. The interpolation process is accomplished by temporarily buffering the digitized input signal (the signal samples) in a memory and using a timing synchronizer (a symbol timing loop) to recall the signal samples from memory and interpolate the recalled signal samples such that the digitized input signal is optimally resampled. Due to the temporary storage and recall of the digitized input signal, the interpolated signal is "bursty" in nature, i.e., the signal is non-continuous. As a result of the burstiness of the interpolated signal, any periodic timing information transmitted by the transmitter will no longer be periodic. This burstiness is removed by inhibiting signal processing when interpolated signals are not available from the interpolator and frequency locking the receiver's oscillator to a received timing signal using the transport timing loop. The transport timing loop, which encompasses the symbol timing loop forming nested loops, synchronizes the transport (or packet level) timing. The transport timing is accomplished by frequency locking the receiver's oscillator to a timing signal transmitted by the transmitter.

In a second embodiment of the invention, the oscillator in the receiver is operated asynchronously. As such, a symbol timing loop accomplishes symbol timing synchronization using the input interpolator and transport timing is accomplished by a separate transport timing loop. The "burstiness"

of the signal that results from the input interpolator is removed using an output interpolator. The output interpolator is located after the application decoders and prior to the display device(s). In this manner, the receiver causes the bursty signal to become continuous using the output interpolator to adjust the presentation time of the received information. As such, the receiver generates continuous signals for display by the presentation device(s) without frequency locking the receiver's oscillator to a received signal.

BRIEF DESCRIPTION OF THE DRAWING

The teachings of the present invention can be readily understood by considering the following detailed description in conjunction with the accompanying drawings, in which:

FIG. 5 depicts a detailed block diagram of a modulo integrator contained in the receiver depicted in FIG. 1;

FIG. 6 depicts a detailed block diagram of a symbol processing controller contained in the receiver depicted in FIG. 1;

FIG. 7 depicts a detailed block diagram of a timing adjustment circuit contained in the receiver depicted in FIG. 1;

To facilitate understanding, identical reference numerals have been used, where possible, to designate identical elements that are common to the figures.

DETAILED DESCRIPTION

Figure 1:
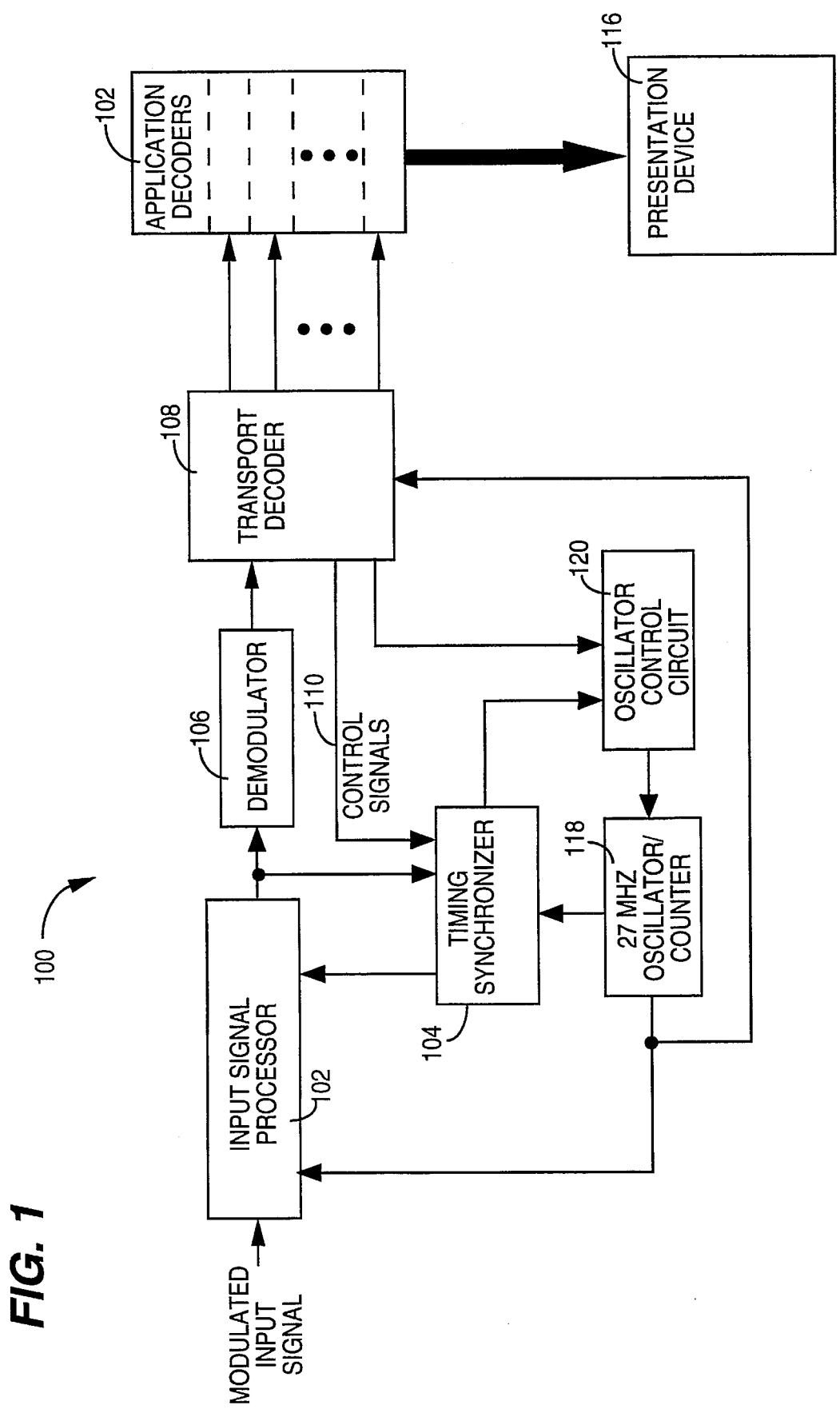
FIG. 1 depicts a high level block diagram of a receiver in accordance with a first embodiment of the invention.

FIG. 1 depicts a high level block diagram of a receiver 100 in accordance with the teachings of a first embodiment of the present invention. The receiver shall be described in the context of a conventional digital television application. However, from the following disclosure, those skilled in the art will understand that this form of inventive receiver can be used in any digital data transmission system that transmits information in packets where one or more packets contain transmitter timing information. In the digital television system, transmitter timing information is periodically transmitted as a program clock reference (PCR) count values. The PCR count values represent time passed since the beginning of a digital television program.

Specifically, the first embodiment of the receiver 100 contains an input signal processor 102, timing synchronizer 104, a demodulator 106, an oscillator control circuit 120, an oscillator (VCXO) 118, a transport decoder 108, one or more application decoders 112, and one or more presentation devices 116. Typically, a tuner (not shown), located prior to the receiver and connected thereto, selects one channel of information for reception from multiple available channels carried by the transmission medium.

The input signal to the input signal processor 102 is a modulated signal, e.g., an M-ary QAM signal, centered at a low intermediate frequency (IF), e.g., a 5 MHz IF having a 6 MHz bandwidth. Although discussed in relation to a QAM signal those skilled in the art will understand that the invention can be utilized with any other form of modulation, e.g., vestigial sideband (VSB), offset QAM (OQAM) and the like. The input signal processor digitizes (samples) the input signal at a rate of 27 million samples per second and interpolates the digitized signal using a process that is commonly known as polyphase filtering. In this application, polyphase filtering optimally resamples the digitized input signal. The resampling process is controlled by a symbol timing loop comprising the input signal processor 102 and the timing synchronizer 104. Once interpolated (resampled), the demodulator 106 demodulates the resampled signal to generate a digital bit stream represented by a series of signal samples, where each sample is a byte of digital data representing a sample of a channel symbol. This digital data contains encoded and compressed video signals, audio signals, and system control information.

The demodulator 106 sends the digital bit stream to the transport decoder 108 wherein a transport timing synchronization signal is generated from transmitter timing information contained in the bit stream. Additionally, the timing synchronizer 104 uses the output signal from the input signal processor 102 to generate a timing synchronization signal. The oscillator control circuit compares this timing synchronization signal to a transport timing synchronization signal to synchronize the timing between the transmitter and the receiver on a transport level such that the receiver can optimally process the received digital bit stream.

The transport decoder 108 depacketizes and demultiplexes the data packets as well as decodes appropriate system control information such that control signals are generated on line 110. The data from the packets is transferred to an appropriate application decoder 112, i.e., video data is sent to an MPEG decoder, audio data is sent to an audio signal decoder, and system control information is sent to one or more control signal decoders.

Because the input signal processor digitizes the input signal without regard to the symbol rate, the receiver can theoretically process any symbol rate up to one-half the rate at which the input signal is digitized. Nonetheless, for improved noise immunity, the symbol rate is preferably limited to one-fourth the rate of which the input signal processor samples the input signal. For example, if the input signal is digitized at 27 MHz, the channel symbol rate can be any rate up to 6.75 Msymbols/sec.

To achieve such flexible receiver operation without a priori synchronizing the digitizing process to the symbol rate, the input signal processor 102 interpolates the digitized signal, i.e., the digitized signal is resampled. However, such interpolation causes the interpolated signal to be "bursty", i.e., a non-continuous signal that will intermittently be present at the output of the input signal processor. As such, the receiver timing must be adjusted to compensate for the bursty nature of the interpolated data such that a continuous output signal is presented to the presentation device(s). In this first embodiment of the receiver, the "bursty" nature of the interpolator output is compensated for by adjusting the frequency of the oscillator and inhibiting all signal processing whenever data is not available from the input interpolator.

Specifically, to achieve timing synchronization, two timing loops are used. The first loop (a symbol timing loop) is formed by the input signal processor 102 and the timing synchronizer 104. The second loop (a transport timing loop) is formed by the input signal processor 102, the demodulator 106, the transport decoder 108, the timing synchronizer 104, the oscillator control circuit 120 and the oscillator/counter 118. The timing loops are "nested" such that the first loop is within the second loop. Timing synchronization enables the first embodiment of the receiver to process the "bursty" information such that, once the receiver achieves timing synchronization, the receiver removes the "bursty" characteristics of the processed information. As a result, the receiver provides continuous signals to the presentation device(s) 116.

Figure 2:
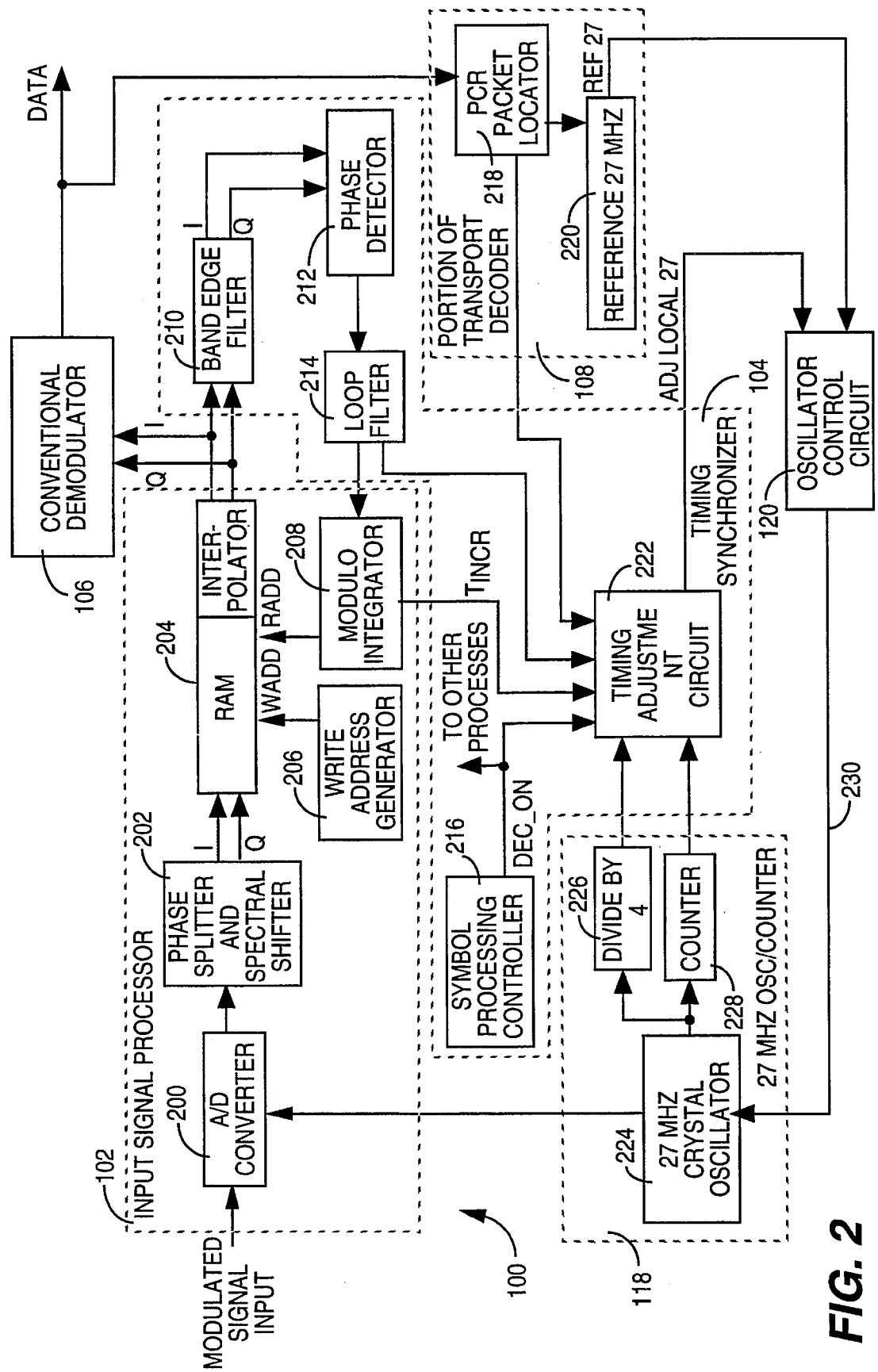
FIG. 2 depicts a detailed block diagram of the receiver depicted in FIG. 1.

FIG. 2 depicts a detailed block diagram of a portion of the first embodiment of receiver 100 that is responsible for timing synchronization (both symbol and transport timing). Specifically, the input signal processor 102 contains an analog-to-digital (A/D) converter 200, a phase splitter and spectral shifter 202, an input interpolator (polyphase filter) 204, a write address (WADD) generator 206, and a modulo integrator 208 as a read address generator. A sample clock (the 27 MHz oscillator signal) drives the A/D converter 200. This sample clock has a rate that is at least two times the expected maximum channel symbol rate. However, typically the clock rate is four times the maximum expected channel symbol rate, e.g., a clock rate of 27 MHz for a maximum expected symbol rate of 6.75 Msymbols per second. Although the receiver is, of course, capable of utilizing other clock rates and channel symbol rates, the following description uses these rates for simplicity and consistency in explaining of the receiver's operation. The phase splitter and spectral shifter 202 processes the digitized input signal to form in-phase (I) and quadrature (Q) baseband signals. The interpolator 204 separately interpolates the I and Q signals. In practice, to interpolate both the I and Q signals, the receiver uses a single interpolator on a time division multiplexed basis.

The interpolator 204 contains a random access memory (RAM) section that is used as a first-in, first-out (FIFO) memory (e.g., a circular buffer) and an interpolator section. The write address generator 206 provides write addresses (WADD) in a sequential manner and at a proscribed, fixed rate (e.g., 13.5 MHz). For each address, the FIFO stores a signal sample (I or Q). Additionally, the modulo integrator 208, discussed below with reference to FIG. 5, produces read addresses (RADD). The modulo integrator has a modulus that is equal to the length of the FIFO. The modulo integrator produces the read addresses at a nominal rate that is slightly greater than the rate at which the write address generator produces write addresses. As such, the FIFO will, if left unchecked, be depleted of all data over a period of time. As such, the write address generation process is intermittently inhibited to allow the FIFO to store a predefined number of bytes of I and Q signal data. As shall be discussed below with reference to FIG. 6, control of this intermittency is provided by the symbol processing controller 216.

In operation, the FIFO forms a ring (or circular) buffer that temporarily stores the I and Q signals. The read addresses (RADD) contain both an integer value and a fractional value. The integer value is used to sequentially access memory locations in the FIFO, while the fractional portion is used by the interpolator section of the interpolator. As is common in digital interpolators, the fractional portion is used to control the interpolation function that is applied to a plurality of signal samples neighboring the signal sample recalled by the integer portion of the read address. The interpolation of the plurality of signal samples provides an interpolated signal. The interpolator produces both I and Q interpolated signals. In essence, the interpolator resamples the input signal. The resampling, as discussed below, is accomplished to provide optimal signal samples for processing by the demodulator even though the actual samples taken from the input signal by the A/D converter are not optimal.

Figures 8, 9:
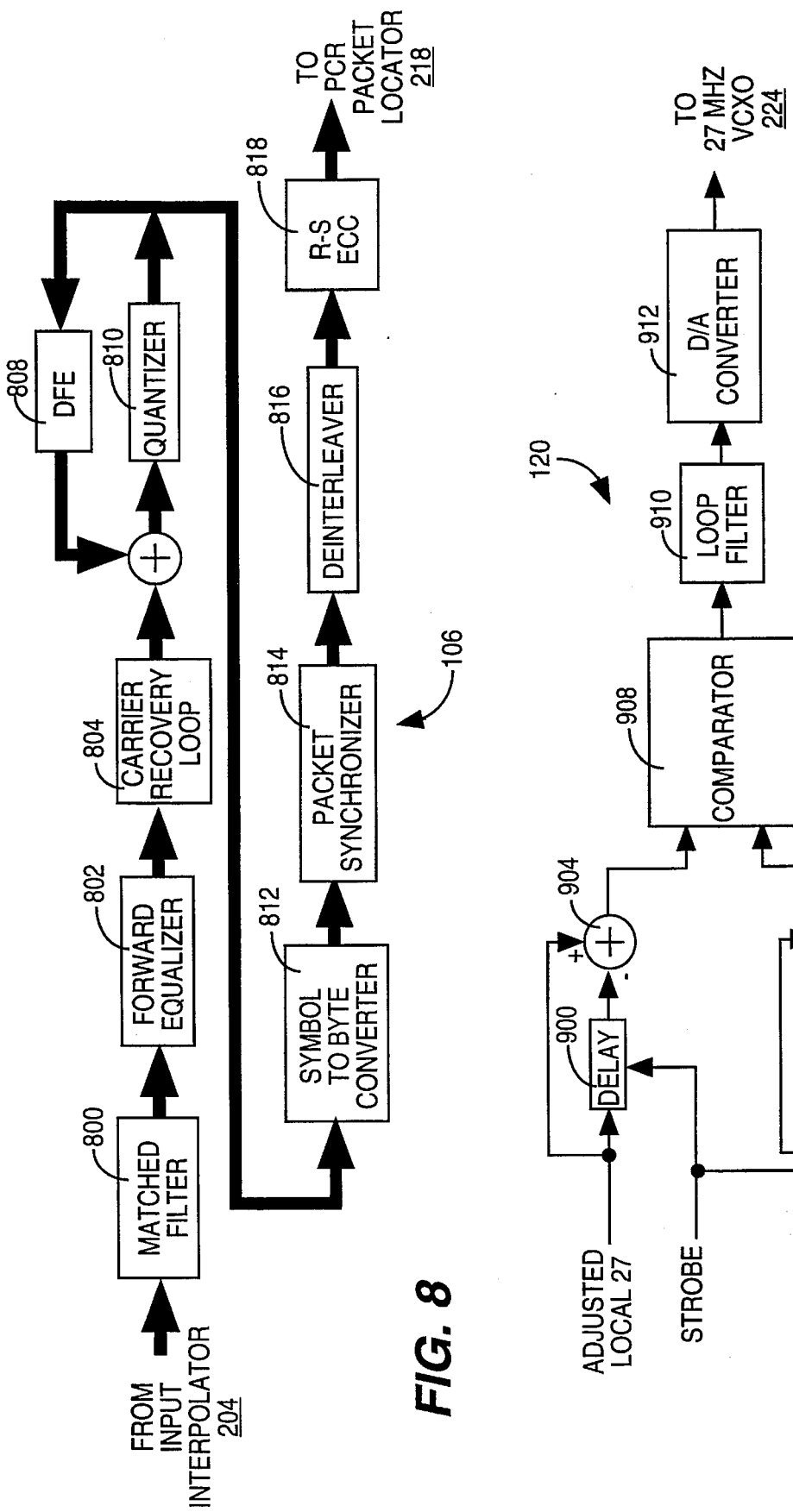
FIG. 8 depicts a detailed block diagram of conventional demodulator contained in the receiver depicted in FIG. 1.
FIG. 9 depicts a detailed block diagram of a voltage controlled oscillator (VCXO) control circuit.

The interpolated values are further processed by a conventional demodulator. An illustrative example of a conventional demodulator is depicted in FIG. 8. The demodulator contains a matched filter 800, a forward equalizer 802, a carrier recovery loop 804, a summer 806, a quantizer 810, a decision feedback equalizer (DFE) 808, a symbol-to-Ntuple converter 812, a packet synchronizer 814, a deinterleaver 816, and a Reed-Solomon error correction coder (R-S ECC) 818. Each of these components are well known in the art and need know further discussion. The output of the conventional demodulator 106 is a digital bit stream (hereinafter referred to as simply data or serial data).

Returning to FIG. 2, the data generated by the demodulator 106 is coupled to a portion of the transport decoder known as the program clock reference (PCR) packet locator 218. The PCR packet is a system control packet that carries timing control information from the transmitter to the receiver. This timing information contains a coded sample of a clock signal that is used within the transmitter. For a digital television system using MPEG video compression, this clock signal is 27 MHz. For other packet-based transmission systems the clock rate may differ; however, the principles of using the transmitted clock information for transport timing synchronization will be the same as herein discussed. Specifically, the coded sample in a digital television system represents the number of cycles of 27 MHz that have occurred since the program currently being transmitted began being transmitted. Using this coded sample, e.g., the PCR count, the transport timing loop in the receiver synchronizes its local 27 MHz clock signal to the transmitter's clock signal.

Specifically, the PCR count is a 33 bit field that is periodically transmitted, e.g., once every 100 milliseconds, within a timing information packet to the receiver. Once received and decoded by the PCR packet locator, the receiver stores the PCR count in register 220. The receiver maintains a coded sample of its local 27 MHz clock signal from oscillator 224 that represents the number of cycles of the clock signal that pass since the current program began being received. The coded sample is the value of counter 228. This counter is initially loaded with a PCR count that is decoded from a first PCR packet received by the receiver after a channel change. From this initial value, the counter 228 counts at a rate set by the local 27 MHz clock rate. As such, if the reference 27 MHz clock in the transmitter is not synchronized with the local 27 MHz clock, then the value of counter 228 will diverge from the count indicated by subsequently received PCR counts. To accurately compare the PCR counts to the local 27 MHz count, the local 27 MHz count is adjusted for the burstiness of the interpolated input signal. The adjusted local 27 MHz count is referred to herein as the adjusted local clock signal (or ADJ. LOCAL 27).

By comparing the reference 27 MHz (referred to herein as REF 27 or PCR count) to a sample of an adjusted local clock signal (ADJ LOCAL 27), the oscillator control circuit 120 produces a control signal on line 230 that is indicative of the difference between the two clock samples. This control signal is used to adjust the frequency of the single 27 MHz crystal oscillator 224 such that the same number of cycles pass at the transmitter and the receiver over the time between samples. Since the single oscillator generates the clock signals for the entire receiver, a clock distribution circuit (not shown) divides and transfers the clock signal to various blocks within the receiver, including the A/D converter and the various applications decoders. As such, the 27 MHz local oscillator becomes synchronized with the transmitter clock frequency.

However, since the input interpolator generates an interpolated signal in bursts, the arrival times of the PCR packets are displaced from their true positions, e.g., they are no longer received as they were transmitted, that is once every 100 milliseconds. In other words, the input interpolator adds timing jitter. Consequently, the samples of the local 27 MHz clock must be adjusted to compensate for the "bursty" nature of the interpolated signal. Such synchronization is accomplished using the timing synchronizer 104. The timing synchronizer contains a bandedge filter 210, a phase detector 212, a loop filter 214, a timing adjustment circuit 222, and a symbol processing controller 216. Specifically, the band edge filter 210 has a bandwidth profile that positions a bandedge slope of the filter centrally at both the high and low band edges of the input signal bandwidth (e.g., at approximately 2 and 8 MHz for a digital television signal). Furthermore, the bandedge filter has a bandedge slope that is the compliment of the slope of the input signal bandedge slope. As such, the filter 210 produces a double sideband, amplitude modulated (DSB AM) signal containing symbol timing information. By processing this DSB AM signal in the phase detector 212, the receiver extracts information regarding whether the input signal sampling is occurring early or late in reference to an optimal sample time.

Figure 3:
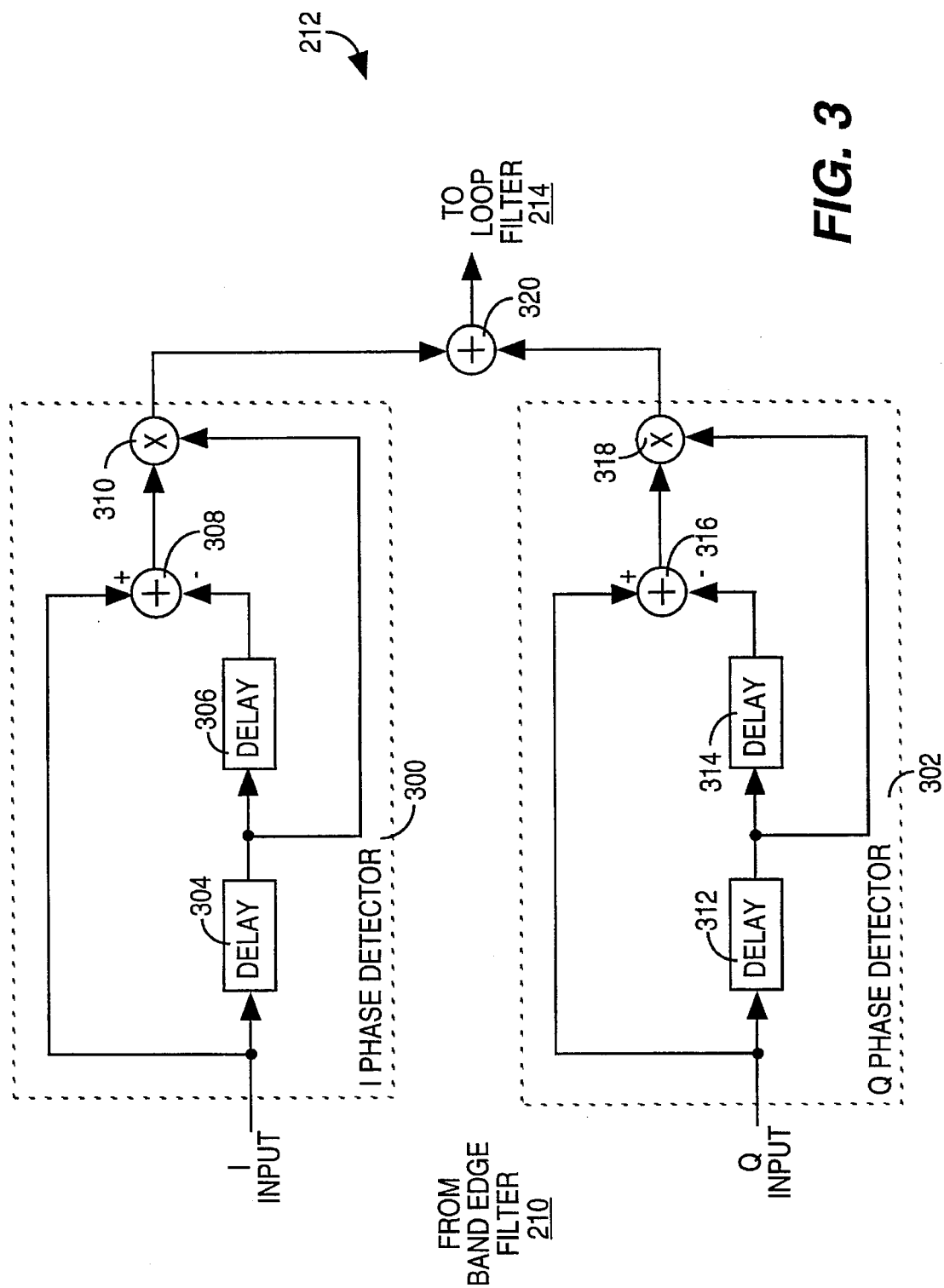
FIG. 3 depicts a detailed block diagram of a phase detector contained in the receiver depicted in FIG. 1.

FIG. 3 depicts a detailed block diagram of the phase detector 212. The phase detector contains an I phase detector 300 and a Q phase detector 302. I phase detector 300 contains a delay 304, a delay 306, a summer 308 and a multiplier 310. The two delays are connected in series such that the I phase input signal sample is delayed by one symbol period, i.e., each delay is one-half a symbol period. The summer subtracts the twice delayed signal from the undelayed I phase input signal sample. The output of the summer 308 is then multiplied, in multiplier 310, by a once delayed signal produced at the output of delay 304. Similarly, the Q phase signal is processed. The processed I and Q signals are summed in summer 320 to produce a signal (referred to hereinafter as an early/late signal) indicating the location of each zero crossing in the input with respect to the sample location. In other words, this signal indicates whether the sampling by the A/D converter has occurred early or late with respect to an optimal sampling time. This "early/late" signal is applied to the input of the loop filter 214.

Figure 4:
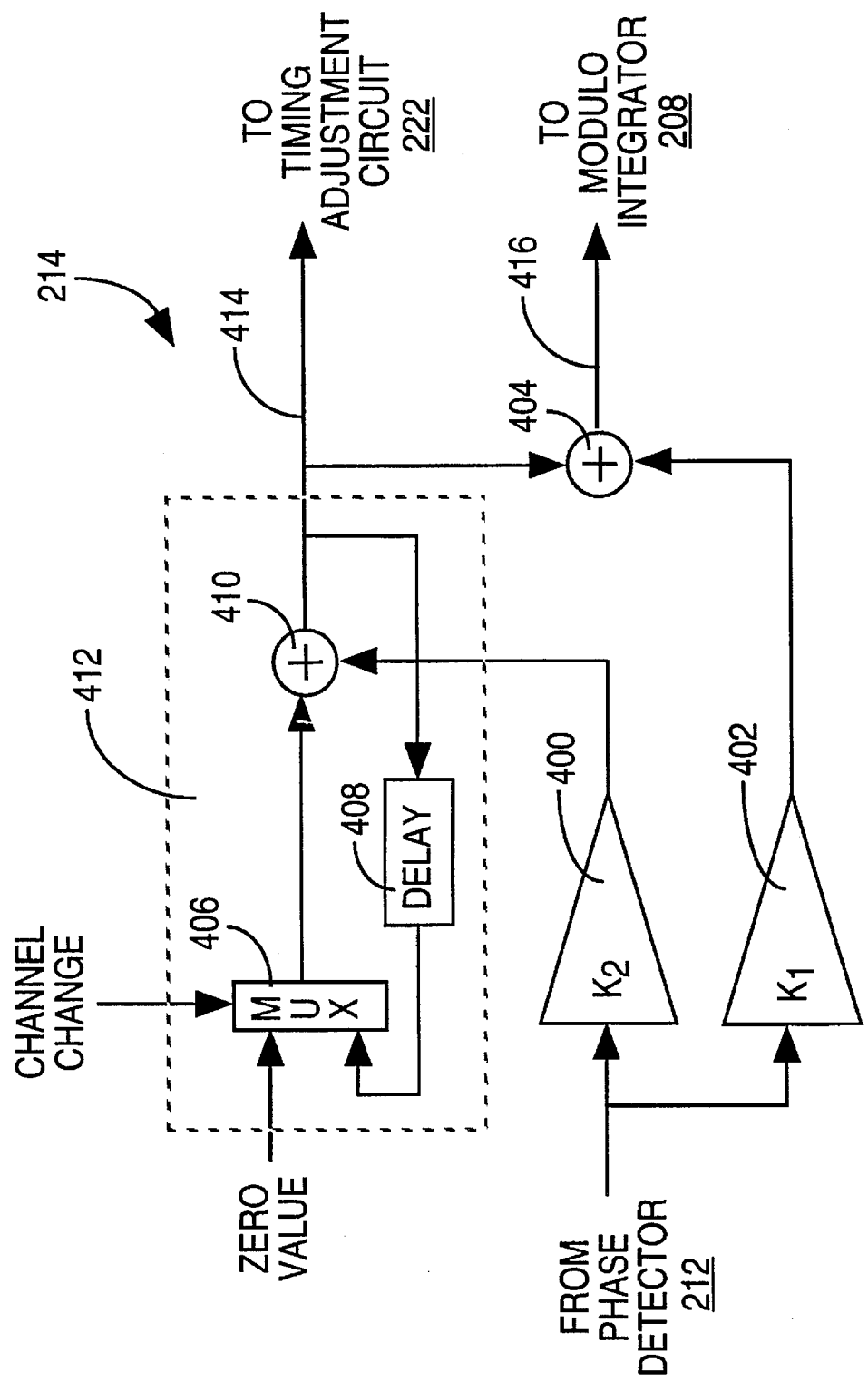
FIG. 4 depicts a detailed block diagram of a loop filter contained in the receiver depicted in FIG. 1.

FIG. 4 depicts a detailed block diagram of the loop filter 214. This filter produces an integrated signal, at port 414, for use by the timing adjustment circuit 222 and an integrated plus proportional signal, at port 416, for use by the modulo integrator 208. Specifically, the early/late signal from the phase detector forms an input to two amplifiers 400 and 402. Amplifier 400 has a gain of $K_2$ and amplifier 402 has a gain of $K_1$. The amplified output of amplifier 400 forms an input to integrator 412. The integrator contains a summer 410, a delay 408, and a multiplexer (MUX) 406. The multiplexer is used to "zero" the integrator whenever a channel change occurs and the receiver must be locked to a new input signal. Thus, upon a channel change occurring, the MUX selects a value of zero to apply to the integrator for a predefined length of time to clear previously integrated values stored in the delay. After clearance of the prior values (e.g., one clock cycle), the MUX selects the delayed output of the adder as the input of the integrator. The output is delayed by passage through delay 408 where the signal is temporarily stored for one clock cycle. The delayed signal is applied, from MUX 406, to one input of summer 410. The second input of summer 410 is the amplified signal from amplifier 400. The integrated output is coupled, via port 414, to the timing adjustment circuit 222. Additionally, the integrated signal is added, in summer 404, to a proportional signal from amplifier 402. This composite signal (integrated plus proportional) is sent, via port 416, to the modulo integrator 208.

FIG. 5 depicts a detailed block diagram of the modulo integrator 208. The modulo integrator contains a look up table 500 that stores values of $T_{INCR}$, two summers 502 and 504, a MUX 506, and a delay 508. The modulo integrator adds the signal from the loop filter 214 to a value of $T_{INCR}$ selected from table 500. The values of $T_{INCR}$ represent an estimated ratio for a given channel of the actual symbol period to the period of the symbol clock. For example, this ratio might be 1/5.0 MHz (actual channel symbol period) divided by 1/6.75 MHz (actual symbol clock period) or 1.35. For each channel, the table stores a value of $T_{INCR}$. The nominal value, if a value is not available for a particular channel, is 1.35 (labeled N in table 500). The other values are $T_{INCR}$ values that were previously used for particular channels, e.g., just prior to a channel change to a new channel, the table stores present value of $T_{INCR}$ for the present channel with reference to the present channel. As such, when that channel is revisited, an initial value of TINCR is available.

The summation of the signal from the loop filter and the $T_{INCR}$ value is summed, in summer 504, with a delayed signal. The delayed signal is formed by passing the output of summer 504 through delay 508. The duration of the delay is one symbol clock period. The output of summer 504 forms the read address (RADD) for the FIFO. This read address contains a integer portion and a fractional portion. The integer portion is used to recall a value from the FIFO and the fractional portion is used during signal interpolation. The modulo integrator 208 also contains a MUX that is used to zero (clear) a stored signal value in delay 508. Upon a channel change, the MUX selects a zero value as the input to the delay over a period that will zero the stored value in the delay.

FIG. 6 depicts a detailed block diagram of the symbol processing controller 216 that turns the entire symbol processing system on and off depending whether symbols are available for processing from the input interpolator. The controller 216 controls the process for emptying the FIFO. Although not specifically depicted in FIG. 2, the symbol processing controller is connected to the modulo integrator as well as every "downstream" processing block including the demodulator processes, the bandedge filter, the phase detector, and the loop filter. As such, whenever sample data is not available from the interpolator, the controller 216 halts all downstream processes until sample data is again available.

Returning to FIG. 6, when the number of values stored in the FIFO reaches a predefined low limit, the retrieval of symbols is inhibited while the FIFO is refilled with new values up to a predefined high limit. Once refilled to the high limit, the retrieval process is restarted. Such starting and stopping of the retrieval process causes the output from the input integrator to be very "bursty" in nature. As discussed above, the symbol processing for timing information and demodulation is inhibited during the period when the FIFO is refilling. The controller 216 produces a control signal (DEC_ON) that is used to control symbol processing.

Specifically, the symbol processing controller 216 contains a subtractor 600, a summer 602, two multiplexers 604 and 606, a comparator 608, and a delay 610. Subtractor 600, summer 602 and MUX 604 are used to determine the current difference between the write address and the read address pointers for the FIFO. As such, subtractor 600 subtracts the read address (RADD) from the write address (WADD). The result of this subtraction forms one input to MUX 604 and one input to summer 602. At summer 602, the output of summer 600 is added to a number representing the total length of the FIFO (referred to in FIG. 6 as CIRCULAR_BUFFER_LENGTH). The result of this summation is a second input to MUX 604. The value selected by the MUX 604 forms one input to comparator 608. To reiterate this portion of the controller 216 in pseudocode:

If (WADD-RADD)≧0;

Then select WADD-RADD;

else;

Select CIRCULAR_BUFFER_SIZE+(WADD-RADD)

As the other input to the comparator 608 is either the high limit value or the low limit value. MUX 606 selects which limit value is used. This MUX is controlled by the signal DEC_ON. When DEC_ON is low (e.g., inhibiting the symbol processing), the high limit is selected. Conversely, when the DEC_ON signal is high (e.g., symbol processing is permitted), the low limit is selected. As such, the comparator will have a low output until the difference between the read and write address pointers attain the high limit value. Thereafter, the comparator output shifts high until the difference between the read and write address pointers falls below the low limit value. Thereafter, the DEC_ON signal is low. To make the controller 216 realizable, the delay 610 delays the output of the comparator by one clock cycle so that the high or low limit value will be exceeded. The DEC_ON signal is sent to the timing adjustment circuit 222, the modulo integrator 208, as well as all other circuitry that processes the symbols in the demodulator.

FIG. 7 depicts a block diagram of the timing adjustment circuit 222. This circuit 222 contains a data valid counter 700, a PCR interval counter 702, a latch 706, a divider 708, and two multipliers 710 and 712. By processing various signals, circuit 222 generates a count value (ADJ. LOCAL 27) that represents a local PCR count for the received packets adjusted to compensate for the "bursty" nature of the interpolated signals, e.g., the local count is adjusted for the periods when a signal is not available from the interpolator.

Specifically, the data valid counter counts the occurrence of pulses representing the system clock divided by four (e.g., with a 27 MHz system clock, the counter counts at a 6.75 MHz rate) when the DEC_ON signal is high. When the DEC_ON signal is low, the present count value is held until either the counter is reset or the counter begins counting again. Additionally, the PCR interval counter counts the same divided clock signal occurrences. Both the PCR interval counter and the data valid counter are reset upon the occurrence of a PCR packet in the received information. The reset strobe (STROBE) is generated by the PCR packet locator 218 in the transport decoder. Summer 704 adds the output from the integral signal from the loop filter to $T_{INCR}$ from the modulo integrator and the result is applied to the latch 706. Also applied to the latch are the data valid counter value, the PCR interval counter value, and the local 27 MHz counter value. The latch 706 latches these signals upon occurrence of the strobe generated by the PCR packet locator 218.

The divider divides the latched data valid counter value (Y) by the PCR interval counter value (X). The result of the division represents an instantaneous processing rate for the system. The instantaneous processing rate is multiplied, in multiplier 710, by the latched summation of the loop filter signal plus $T_{INCR}$ to generate a correction factor. The correction factor is multiplied, in multiplier 712, by the latched 27 MHz counter value to form a corrected or adjusted 27 MHz count value (ADJ. LOCAL 27). The adjusted local 27 is the 27 MHz clock count value that has been adjusted for the burstiness of the symbols that have passed through the interpolator. This adjusted local 27 is then combined with the reference 27 value to produce a control voltage for the 27 MHz VCXO.

FIG. 9 depicts a detailed block diagram of the oscillator control circuit 120 that combines the reference 27 and the adjusted local 27 to form a VCXO control signal. Using this form of control circuit frequency locks the 27 MHz oscillator in the receiver to the 27 MHz oscillator in the transmitter. Specifically, the circuit 120 processes the adjusted local 27 and the reference 27 in a differential manner. The differential processing of each value is accomplished by two delays 900 and 902 and two subtractors 904 and 906. Each of the delays are controlled by the strobe signal from the PCR packet locator. This strobe signal occurs when each PCR packet occurs. Thus, the subtractor 904 subtracts the present adjusted local 27 value from the adjusted local 27 value that occurred at the previous PCR packet occurrence. The same subtraction is used for the reference 27. The differential values from the subtractors 904 and 906 form input signals to the comparator 908. The output of the comparator (e.g., the difference between the differentiated adjusted local 27 and the differentiated reference 27) is applied to a loop filter 910. Digital-to-analog (D/A) converter 912 converts the output of the loop filter to an analog signal. The resultant analog signal is used to frequency control the 27 MHz VCXO. Consequently, the single 27 MHz oscillator in the receiver is locked to the 27 MHz oscillator in the transmitter. As such, transport timing is synchronized. As a result of achieving timing synchronization, the A/D converter in the input signal processor optimally samples the input signal and the output data from the transport decoder contains continuous data streams for use by the presentation device.

Figure 12:
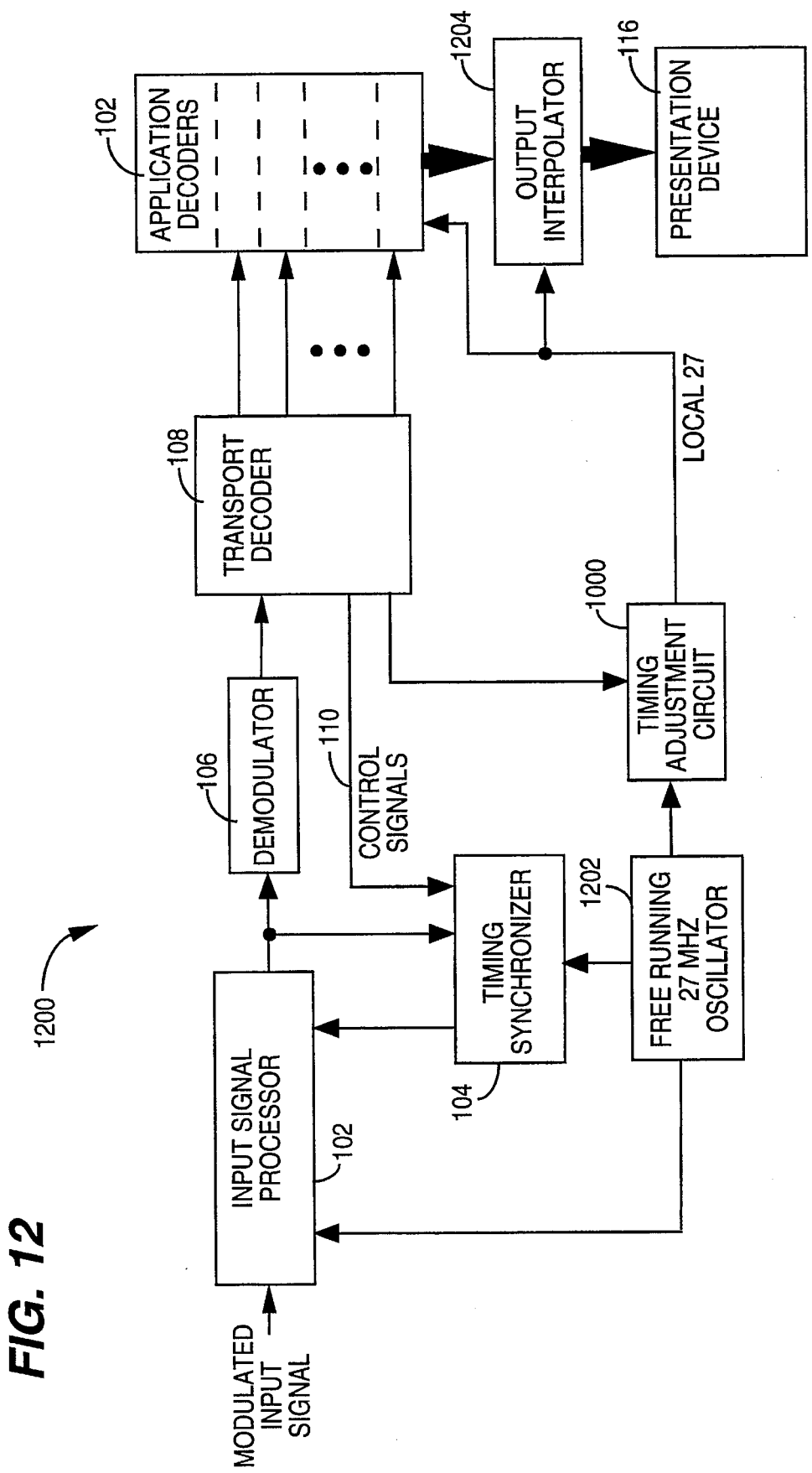
FIG. 12 depicts a high level block diagram of a receiver in accordance with a second embodiment of the invention.

FIG. 12 depicts a block diagram of a second embodiment of the receiver 1200 containing an asynchronous (free running) oscillator 1202 rather than a VCXO as used in the first embodiment of the invention. In this second embodiment, the free running oscillator 1202 is used to asynchronously sample the input signal. As with the first embodiment, this second embodiment contains an input signal processor 102, a demodulator 106, a timing synchronizer 104, a transport decoder 108, application decoders 102, and one or more presentation devices 116. Each of these components functions in an identical manner to those discussed above. The receiver 1200 further contains an timing adjustment circuit 1000 and an output interpolator 1204. In this embodiment, it is important to note that the free running oscillator is not frequency locked to the transmitter oscillator.

Figure 13:
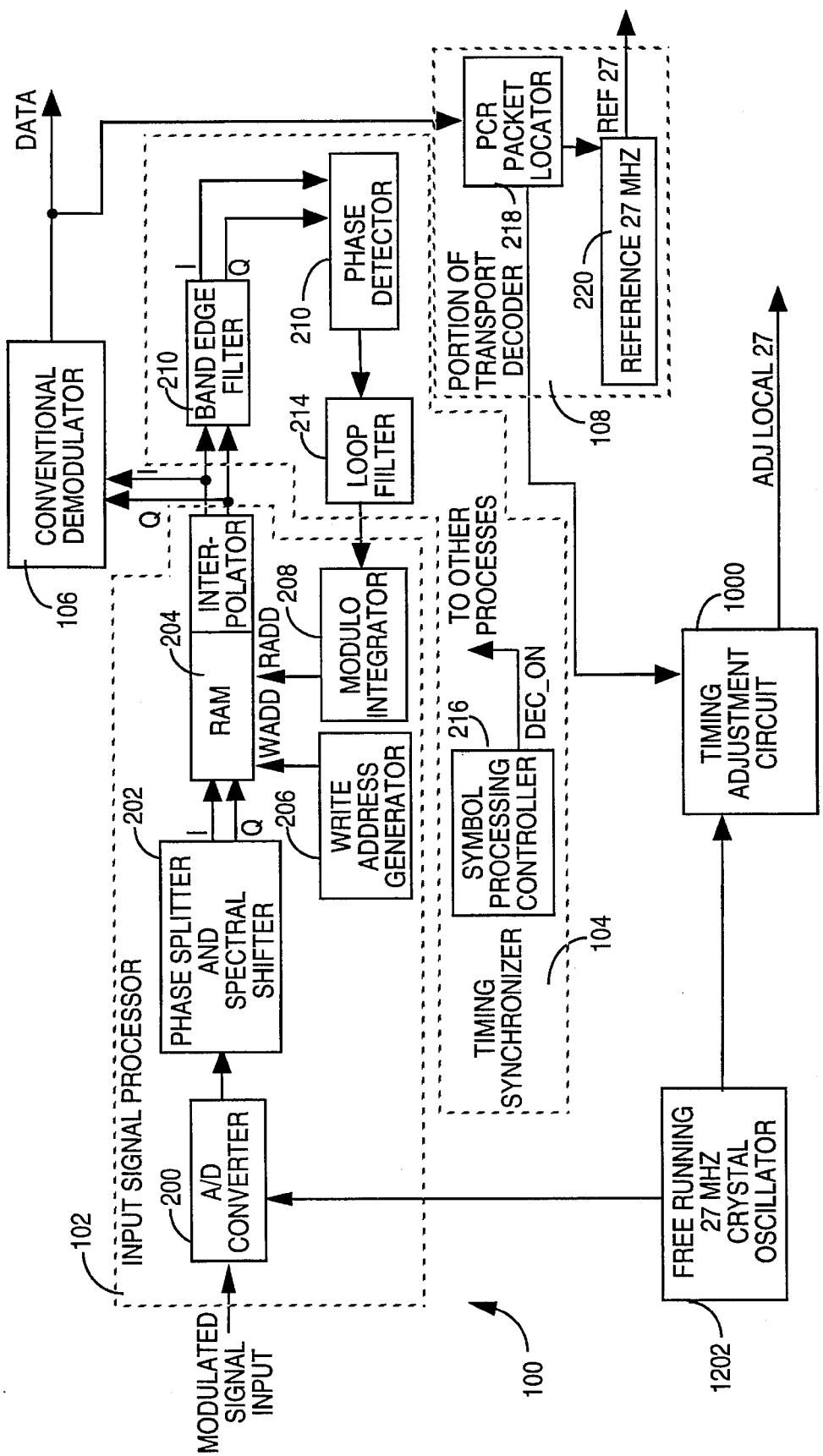
FIG. 13 depicts a detailed block diagram of the receiver depicted in FIG. 12.

FIG. 13 depicts a detailed block diagram of the receiver 1200 in FIG. 12. The component parts of the input signal processor 102, demodulator 106, timing synchronizer 104, and portion of the transport decoder responsible for locating the PCR packets function identically to those described above. As such, these components need no further discussion. The oscillator is a free running 27 MHz oscillator having no control port whatsoever. It merely provides a 27 MHz signal to the A/D converter 200 and the timing adjustment circuit 1000.

Figure 10:
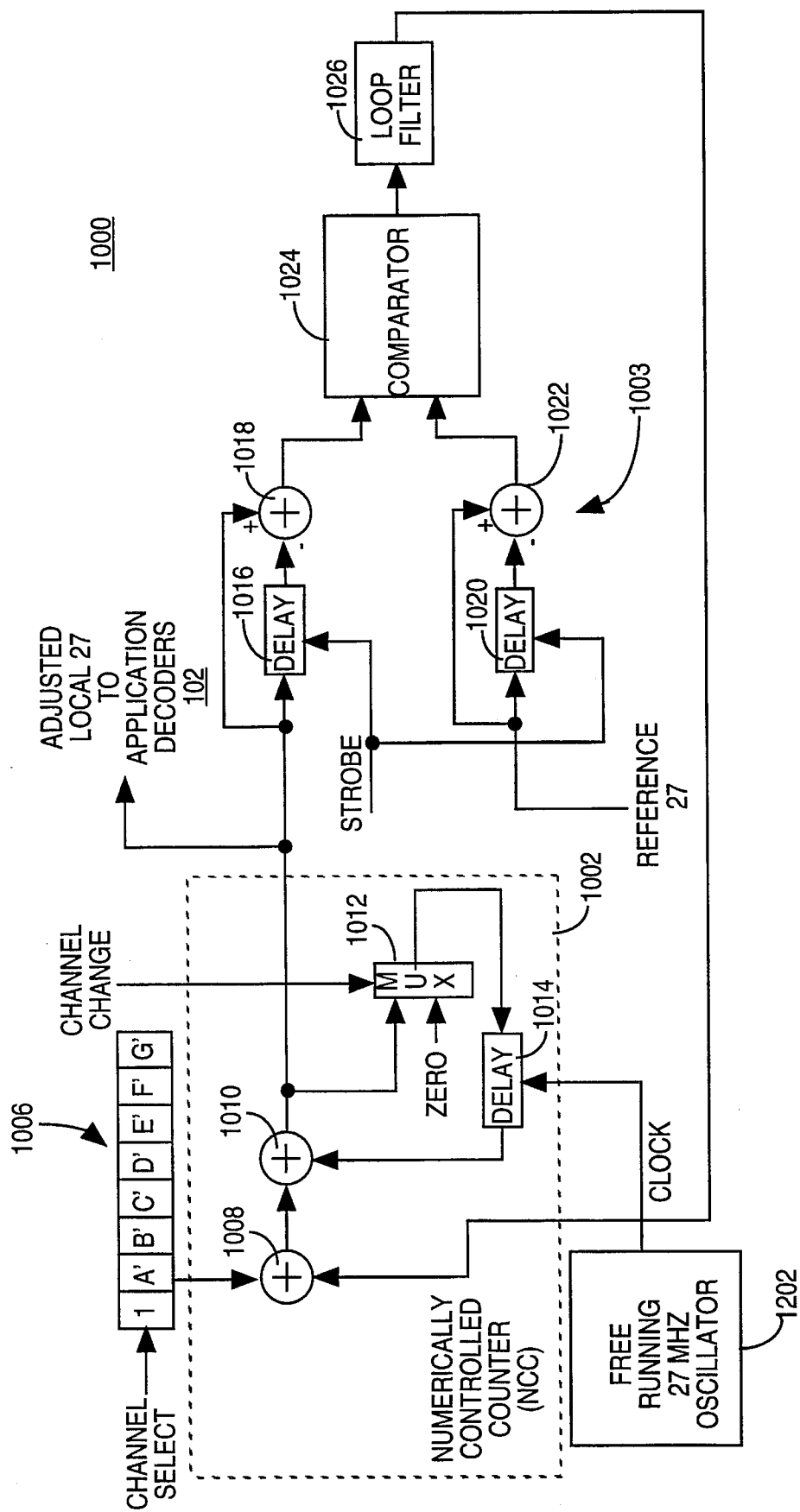
FIG. 10 depicts a detailed block diagram of a digital numerically controlled counter (NCC) and its control circuit.

FIG. 10 depicts a detailed block diagram of the timing adjustment circuit 1000. The circuit 1000 contains a numerically controlled counter 1002 (NCC) and a comparator circuit 1003. Using such a circuit enables the free running 27 MHz oscillator 1202 in the receiver to free-run, i.e. operate asynchronously, and still provide a synchronously operated receiver. Consequently, the 27 MHz oscillator in the receiver is not locked to the 27 MHz oscillator in the transmitter. As such, the 27 MHz oscillator provides a signal upon which the NCC counts by N for each cycle of the 27 MHz signal. Where N is 1 whenever the local and reference oscillators have exactly the same frequency, N is less than 1 whenever the local oscillator is higher in frequency than the reference oscillator, and N is greater than 1 whenever the local oscillator has a frequency that is greater then the reference oscillator frequency. Of course, the local oscillator is the free running 27 MHz oscillator and the reference oscillator is the oscillator in the transmitter. The reference oscillator frequency is indicated by the PCR count. Specifically, the NCC adds a fractional count to the integer count value of the NCC based upon a measured difference between the reference 27 (PCR packet locator output) and the local 27 (NCC output) signals. As such, the NCC counts in fractional increments.

More specifically, a look up table 1006 is provided to predefine the fractional increment based upon historical offset values for each channel. The selected channel number is used as an address to retrieve an initial fractional increment value (A', B', C', and so on) or, if a particular channel has never been selected before, a nominal value of one. This initial value is in effect the ratio of the reference 27 to the local 27 that was measured at a previous utilization of that particular channel. After a channel change, the last ratio for that channel is stored in the table. This initial fractional value is adjusted by the output of loop filter 1026. The adjustment is performed by summing, in summer 1008, the loop filter output with the initial fractional value. The fractional value is then added, in summer 1010, to the previous count value from delay 1014. The delay 1014 is under control of the free running oscillator 1004 such that, upon each cycle of the oscillator output, the count at the input to the delay is clocked through the delay. The NCC is cleared (zeroed) at each channel change using the MUX 1012, i.e., a zero value is selected by the MUX and applied to the delay until all values stored in the delay are zero.

The output signal of the NCC (the adjusted local 27) is sent to the application decoders (e.g., an MPEG video decoder, a compressed audio decoder, and the like). An illustrative example using the NCC output in application decoders is discussed below with respect to FIG. 11. As further shown in FIG. 10, the NCC output signal is also differentiated using delay 1016 and subtractor 1018. Similarly, the reference 27 signal generated by the PCR packet locator is differentiated using delay 1020 and subtractor 1022. The delay is controlled by the strobe signal generated by the PCR packet locator, i.e., at each occurrence of the strobe, the input to the delay is clocked through the delay. Comparator 1024 compares the differentiated values of the NCC output and the reference 27 signal. The loop filter 1026 filters the output of the comparator and then applies the filtered signal to summer 1008. As such, differences between the NCC output signal (adjusted local 27) and the reference 27 signal are compensated for such that the two signals are eventually frequency locked to one another, i.e., the PCR count is the same as the NCC count. Note that the NCC control circuit 1000 has no connection to the symbol timing loop, i.e., timing synchronizer 104, input signal processor 102, demodulator 106 in FIG. 12. These elements operate exactly as discussed above with the exception that the 27 MHz signal that they utilize is free running. The output of the NCC control circuit (adjusted local 27) is used solely during output interpolation as described below.

Figure 11:
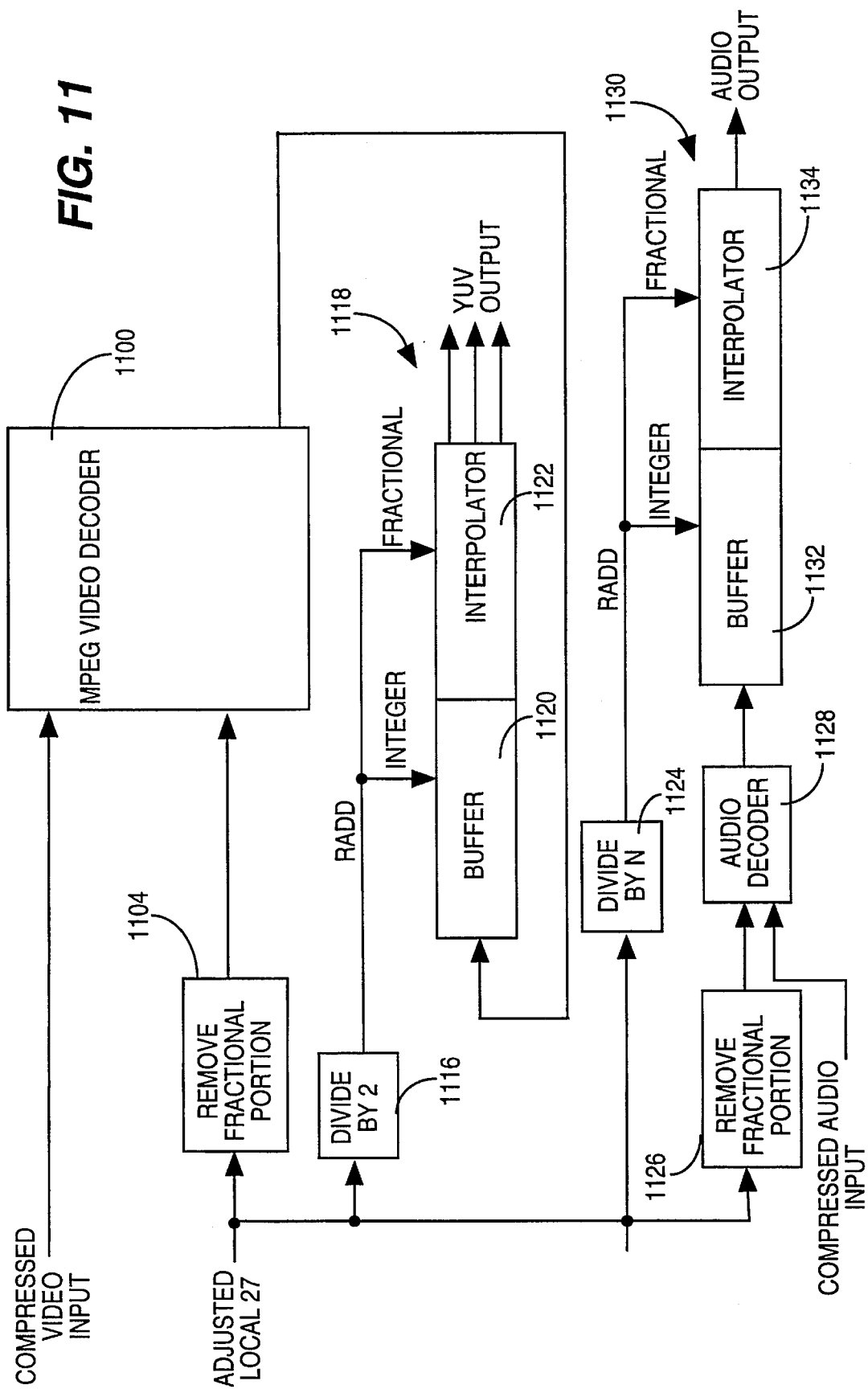
FIG. 11 depicts a block diagram of an illustrative application of the NCC of FIG. 10 as used in conjunction with an MPEG decoder and a compressed audio decoder.

In the illustrative example depicted in FIG. 11, the adjusted local 27 signal is used by both an MPEG video decoder 1100 and a compressed audio decoder 1128. In this example, the burstiness of the data is removed from the decoded signals using output interpolators 1118 and 1130 to interpolate the signals decoded by each application decoder. These output interpolators operate in exactly the same manner as the input interpolator of FIG. 1. Specifically, the decoded video and audio data is written into respective circular buffers 1120 and 1132 at a first rate and read from the respective buffers at a second rate.

More specifically, the transport decoder provides the MPEG decoder with a compressed video signal and provides the audio decoder with a compressed audio signal. Since, in this receiver embodiment, the 27 MHz clock signal used throughout the receiver is not adjusted for signal burstiness, the output of the decoders is bursty in nature. The MPEG decoder and the audio decoder utilize the integer portion of the adjusted local 27 signal as a clock signal to facilitate decoding of the respective compressed signals. The decoding is accomplished in a well-known manner that forms no part of the invention. Block 1104 removes the fractional portion of the adjusted local 27 signal, leaving only the integer portion of this NCC count value for use by the decoders.

The output signal from the MPEG decoder is buffered in buffer 1120 and interpolated in interpolator 1122. The adjusted local 27 value is divided by 2 in divider 1116 and applied to the buffer to control data access and to the interpolator to control the interpolation process. Specifically, the integer portion of the divided count value forms a read address (RADD) for the buffer and the fractional portion of the count value is used to interpolate the retrieved buffer value in a well known manner. As such, the "bursty" data from the MPEG decoder 1114 is interpolated to generate a continuous YUV output signal that is used by the presentation device to display a video signal.

Similarly, block 1126 removes the fractional portion of adjusted local 27 value and the audio decoder 1128 uses that integer value to decode a compressed audio input signal. Buffer 1132 and interpolator 1134 are used to provide a continuous audio output to the audio presentation device. Access to the buffer 1132 is controlled by the adjusted local 27 value divided by N in block 1124. Where N depends upon the clock rate needed to continuously access data from the buffer.

Buffer overflow and underflow is avoided in buffers 1120 and 1132 because the application decoders, which have been synchronized since they both use the adjusted local 27, supply data to their respective output interpolators at an average rate that is the same as the continuous rate that data is interpolated and sent to the presentation devices. As such, the burstiness of the data is removed and the receiver provides the presentation devices with only continuous data.

The foregoing disclosure describes the various embodiments of the invention as if the invention were implemented as a hardware device. However, those skilled in the art will understand that, since the receiver is purely a digital system, such a receiver can be implemented as one or more software routines executed by a microprocessor. The software routines generally perform the functions associated with each block in FIGS. 1 through 13.

Although various embodiments which incorporate the teachings of the present invention have been shown and described in detail herein, those skilled in the art can readily devise many other varied embodiments that still incorporate these teachings.

What is claimed is:

1. A receiver for demodulating a packetized input signal containing encoded timing information, comprising:

an oscillator for generating a sampling signal;

digitizing means, connected to said oscillator, for digitizing the packetized input signal using the sampling signal;

interpolating means, connected to said digitizing means, for interpolating the digitized signal to produce an interpolated signal;

a first timing loop, connected to said interpolating means, for synchronizing the interpolating means whereby channel symbols within the packetized input signal are optimally interpolated;

a demodulator, connected to said interpolating means, for demodulating the interpolated signal to produce a baseband signal;

a transport decoder, connected to said demodulator, for extracting said encoded timing information from said baseband signal;

a second timing loop, connected to said transport decoder and said oscillator, for synchronizing the sampling signal to the extracted timing information; and decoder means, connected to said transport decoder, for decoding information contained in said baseband signal to generate a decoded signal.

2. The receiver of claim 1 wherein said decoded signal is utilized by one or more presentation devices.

3. The receiver of claim 1 wherein said interpolating means further comprises:

a circular buffer;

a write address generator for generating write addresses for the circular buffer at a first rate;

a read address generator for generating read address for the circular buffer at a second rate; and where said second rate is faster than said first rate.

4. The receiver of claim 3 further comprising a symbol processing controller, connected to said read address generator, for inhibiting generation of the read addresses whenever a difference between a present read address and a present write address is less than a predefined first limit.

5. The receiver of claim 4 wherein said first timing loop further comprises:

a bandedge filter, connected to said interpolating means, for filtering said interpolated signal;

a phase detector, connected to said bandedge filter, for generating an early/late signal that indicates whether the digitizing means is sampling the input signal early or late with respect to an optimal sampling point;

a loop filter, connected to said phase detector, for filtering said early/late signal; and said filtered early/late signal forms an input to the read address generator whereby each read address is altered to cause the interpolator to optimally resample the digitized input signal.

6. The receiver of claim 1 further comprises:

a counter, connected to said oscillator, for counting, in response to said sampling signal, to generate a local count value;

a timing adjustment circuit, connected to said counter, for adjusting said local count value to compensate for burstiness in said interpolated signal.

7. The receiver of claim 6 further comprises means for initially setting said counter at a count value defined by a first transmitter count value within a first packet containing encoded timing information.

8. The receiver of claim 7 further comprising:

an oscillator control circuit, connected to said timing adjustment circuit and said transport decoder, for comparing said adjusted local count value and extracted timing information containing a transmitter count value to produce a control signal for said oscillator.

9. The receiver of claim 8 wherein said oscillator control circuit further comprises:

an adjusted local count value differentiator for differentiating said adjusted count value;

a transmitter count value differentiator for differentiating said transmitter count value;

a comparator for comparing said differentiated transmitter count value to said differentiated adjusted local count value and for producing an error signal;

a loop filter for filtering said error signal, said filtered error signal is a control signal for the oscillator.

10. The receiver of claim 1 wherein the timing information is a program reference count.

11. A receiver for demodulating a packetized input signal containing encoded timing information, comprising:

a free running oscillator for producing an asynchronous sampling signal;

digitizing means, connected to said free running oscillator, for digitizing the packetized input signal using the asynchronous sampling signal;

interpolating means, connected to said digitizing means, for interpolating said digitized signal to produce an interpolated signal;

a first timing loop, connected to said interpolating means, for synchronizing the interpolating means whereby symbols within the digitized signal are optimally interpolated;

a demodulator, connected to said interpolating means, for demodulating the interpolated signal to produce a baseband signal;

a transport decoder, connected to said demodulator, for extracting the encoded timing information from said baseband signal;

a transport timing loop, connected to said transport decoder, for synchronizing a numerically controlled counter to the extracted timing information;

decoder means, connected to said transport decoder and said numerically controlled counter, for decoding information contained in said baseband signal to generate a decoded signal; and an output interpolator, connected to decoder means and said numerically controlled oscillator, for interpolating said decoded signal to generate a continuous output signal.

12. The receiver of claim 11 wherein said decoded signal is utilized by one or more presentation devices.

13. The receiver of claim 11 wherein said interpolating means further comprises:

a circular buffer;

a write address generator for generating write addresses for the circular buffer at a first rate;

a read address generator for generating read address for the circular buffer at a second rate; and where said second rate is faster than said first rate.

14. The receiver of claim 13 further comprising a symbol processing controller, connected to said read address generator, for inhibiting generation of the read addresses whenever a difference between a present read address and a present write address is less than a predefined first limit.

15. The receiver of claim 14 wherein said first timing loop further comprises:

a bandedge filter, connected to said interpolating means, for filtering said interpolated signal;

a phase detector, connected to said bandedge filter, for generating an early/late signal that indicates whether the digitizing means is sampling the input signal early or late with respect to an optimal sampling point;

a loop filter, connected to said phase detector, for filtering said early/late signal; and said filtered early/late signal forms an input to the read address generator whereby each read address is altered to cause the interpolator to optimally resample the digitized input signal.

16. The receiver of claim 15 further comprising a numerically controlled counter control circuit for controlling said numerically controlled counter in response to a control signal generated by comparing the extracted timing information with a numerically controlled counter count value.

17. The receiver of claim 16 wherein said numerically controlled counter control circuit further comprises:

a numerically controlled counter count value differentiator for differentiating said numerically controlled counter count value;

a extracted timing information differentiator for differentiating said extracted timing information;

a comparator for comparing differentiated numerically controlled counter count value to said differentiated extracted timing information to produce an error signal;

a loop filter for filtering said error signal to produce a numerically controlled counter control signal whereby said numerically controlled counter counts in response to the sampling signal and the numerically controlled counter control signal.

18. The receiver of claim 11 wherein the timing information is a program reference count.

19. A method of synchronizing a receiver and transmitter, where the transmitted signal is a packetized digital signal having transmitter timing information contained in periodically transmitted packets, said method comprising the steps of:

digitizing said packetized digital signal to produce a digitized signal using a sampling signal from an oscillator;

interpolating said digitized signal to produce an interpolated signal;

processing said interpolated signal to synchronize said interpolation;

extracting said transmitter timing information from said packets;

initializing a counter with an initial count value equivalent to a transmitter count value contain in said timing information;

counting, said sampling signal, from the initial value to produce a local count value;

adjusting the local count value to compensate for burstiness in said interpolated signal;

comparing said adjusted local count value to said transmitter count value in subsequently received packets containing transmitter timing information;

producing an oscillator control signal in response to the comparison of the adjusted local count value and the transmitter count value; and controlling said oscillator with said control signal whereby said receiver is synchronized with said transmitter.

20. A method of synchronizing a receiver and transmitter, where the transmitted signal is a packetized digital signal having transmitter timing information contained in periodically transmitted packets, said method comprising the steps of:

digitizing said packetized digital signal to produce a digitized signal using an asynchronous sampling signal from a free running oscillator;

interpolating said digitized signal to produce an interpolated signal;

processing said interpolated signal to synchronize said interpolation;

extracting said transmitter timing information from said packets;

counting, said sampling signal, with a numerically controlled counter to produce a local count value;

adjusting the local count value to compensate for burstiness in said interpolated signal by applying a control signal to the numerically controlled counter;

comparing said adjusted local count value to said transmitter count value in received packets containing timing information;

producing a numerically controlled counter control signal in response to the comparison of the adjusted local count value and the transmitter count value; and controlling said numerically controlled counter with said control signal whereby said receiver is synchronized with said transmitter.

21. The method of claim 20 further comprising the steps of;

decoding said interpolated signal using said adjusted local count value to produce decoded data; and interpolating said decoded data using said adjusted count value to produce a continuous data stream.

* * * * *